(12) United States Patent
Ou-Yang et al.

(10) Patent No.: US 7,379,266 B1
(45) Date of Patent: May 27, 2008

(54) DISK DRIVE INCLUDING A FILTER COMPONENT WITH COARSE AND FINE SECTIONS

(75) Inventors: Jin Hui Ou-Yang, San Jose, CA (US); Michael G. Choy, Mountain View, CA (US); Jen-Tai Lin, Cupertino, CA (US); Chiao-Ping Ku, Fremont, CA (US); Lin Yang, San Jose, CA (US); Gary C. Griffin, Boulder Creek, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/856,165

(22) Filed: Sep. 17, 2007

Related U.S. Application Data

(62) Division of application No. 10/769,312, filed on Jan. 31, 2004, now Pat. No. 7,280,311.

(51) Int. Cl.
   *G11B 33/14* (2006.01)
(52) U.S. Cl. .................................. 360/97.02
(58) Field of Classification Search ............. 360/97.02, 360/97.03; 720/648
   See application file for complete search history.

(56) References Cited

U.S. PATENT DOCUMENTS

| | | | |
|---|---|---|---|
| 4,629,483 A | 12/1986 | Stanton | |
| 4,661,255 A | 4/1987 | Aumann et al. | |
| 4,886,527 A | 12/1989 | Fottinger et al. | |
| 4,976,858 A | 12/1990 | Kadoya | |
| 4,983,193 A | 1/1991 | Tani et al. | |
| 5,538,545 A | 7/1996 | Dauber et al. | |
| 5,593,482 A | 1/1997 | Dauber et al. | |
| 5,667,544 A | 9/1997 | Haas et al. | |
| 5,871,567 A | 2/1999 | Covington et al. | |
| 6,238,467 B1 | 5/2001 | Azarian et al. | |
| 6,266,208 B1* | 7/2001 | Voights | 360/97.02 |
| 6,369,977 B1 | 4/2002 | Imai et al. | |
| 6,473,264 B2* | 10/2002 | Bae et al. | 360/97.02 |
| 6,488,731 B2* | 12/2002 | Schultheiss et al. | 55/486 |
| 6,572,685 B2 | 6/2003 | Dunshee | |
| 6,618,222 B1* | 9/2003 | Watkins et al. | 360/97.02 |
| 6,643,914 B1 | 11/2003 | Xu | |
| 6,876,514 B1 | 4/2005 | Little | |
| 6,940,687 B2 | 9/2005 | Hong et al. | |
| 7,023,655 B2* | 4/2006 | Smith | 360/97.02 |
| 7,130,150 B2 | 10/2006 | Ng et al. | |
| 7,166,142 B2 | 1/2007 | Tuma et al. | |
| 7,239,475 B1* | 7/2007 | Lin et al. | 360/97.02 |
| 7,291,208 B2 | 11/2007 | Dauber et al. | |
| 2002/0011051 A1* | 1/2002 | Schultheib et al. | 55/382 |

(Continued)

*Primary Examiner*—Brian E. Miller
(74) *Attorney, Agent, or Firm*—Stacey A. Mollohan, Esq.

(57) ABSTRACT

There is provided a disk drive including a disk drive base, a disk rotatably coupled to the disk drive base, and a spindle motor attached to the disk drive base and configured to support the disk for rotating the disk with respect to the disk drive base. The disk drive further includes a filter component. The filter component includes a filter housing coupled to the disk drive base, and a pair of filter elements disposed within the filter housing for filtering disk rotation induced airflow. Each filter element includes a coarse section and a fine section, wherein the coarse section is positioned upstream of the fine section relative to a direction of the induced airflow.

4 Claims, 4 Drawing Sheets

U.S. PATENT DOCUMENTS

2003/0037676 A1* 2/2003 Dunshee .................... 96/59
2003/0218829 A1* 11/2003 Hong et al. .............. 360/97.02
2006/0177352 A1 8/2006 Ziegmann et al.

* cited by examiner

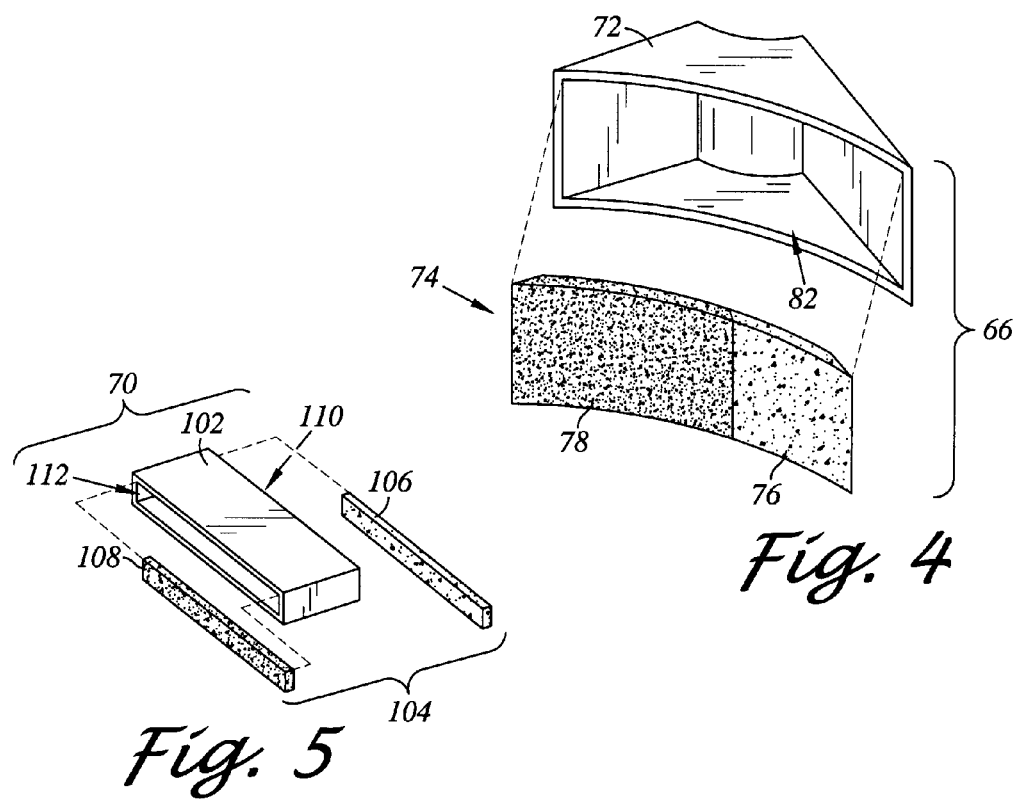
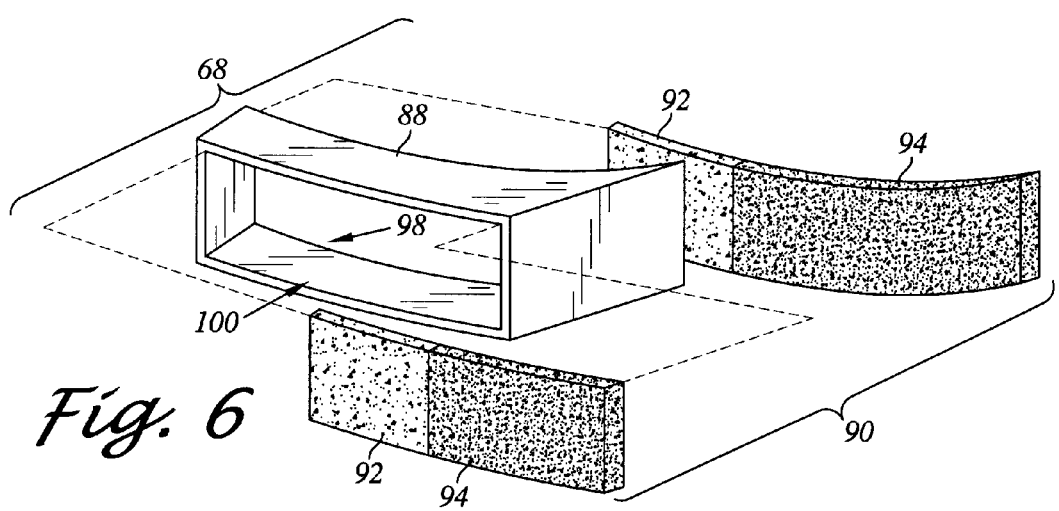

DISK DRIVE INCLUDING A FILTER COMPONENT WITH COARSE AND FINE SECTIONS

CROSS-REFERENCE TO RELATED APPLICATIONS

This application is a divisional of U.S. patent application Ser. No. 10/769,312, filed Jan. 31, 2004, and is incorporated by reference in its entirety.

BACKGROUND OF THE INVENTION

1. Field of the Invention

The present invention relates generally to disk drives, and in particular to a disk drive including a filter component with coarse and fine sections.

2. Description of the Prior Art

The typical hard disk drive includes a head disk assembly (HDA) and a printed circuit board assembly (PCBA) attached to a disk drive base of the HDA. The head disk assembly includes the disk drive base, a cover, at least one magnetic disk, a spindle motor for rotating the disk, and a head stack assembly (HSA) that includes a transducer head supported by a slider (collectively referred to as "head" or "slider") for reading and writing data from and to the disk.

The spindle motor includes a spindle motor hub that is rotatably coupled to the disk drive base. The spindle motor hub has an outer hub flange that supports a lowermost one of the disks. Additional disks may be stacked and separated with annular disk spacers that are disposed about the spindle motor hub. The spindle motor typically includes a spindle motor base that is attached to the disk drive base. A shaft is coupled to the spindle motor base and the spindle motor hub surrounds the shaft. The spindle motor hub may be rotatably coupled to the shaft and therefore the spindle motor base typically via a pair of bearing sets. A stator is positioned about the shaft and is attached to the spindle motor base. A magnet element is attached to the hub flange. The stator includes windings that selectively conduct current to create a magnetic field that interacts with the various poles of the magnet element. Such interaction results in forces applied to the spindle motor hub that tend to rotate the spindle motor hub and the attached disks.

The printed circuit board assembly includes a servo control system in the form of a disk controller for generating servo control signals. The head stack assembly is controllably positioned in response to the generated servo control signals from the disk controller. In so doing, the attached sliders are moved relative to tracks disposed upon the disk.

The head stack assembly includes an actuator assembly including the sliders and a flex circuit cable assembly attached to the actuator assembly. A conventional "rotary" actuator assembly (also referred to as "rotary actuator" or simply "actuator") typically comprises an actuator body, a pivot bearing cartridge, a coil portion that extends from one side of the actuator body to interact with one or more permanent magnets to form a voice coil motor, and one or more actuator arms which extend from an opposite side of the actuator body to a distal end of the actuator assembly. The actuator body includes a bore and the pivot bearing cartridge engaged within the bore for allowing the actuator body to rotate between limited positions. At least one head gimbal assembly (HGA) is distally attached to each of the actuator arms. Each head gimbal assembly biases a head towards the disk. In this regard, the actuator assembly is controllably rotated so as to move the heads relative to the disks for reading and writing operations with respect to the tracks contained on the disks.

A topic of concern is contamination within the disk drive, and in particular, the rate and efficiency of filtering contamination. Various airflow circulation filtering systems have been utilized in the art. A typical arrangement is to provide a vertically disposed rectangular filter within a cavity of the disk drive. The filter is positioned such that disk rotation induced airflow impinges upon the filter. While much of the airflow flows through the filter, some airflow is found to flow upwards towards the cover. Such redirected airflow may tend to flow about the surface of the uppermost disk. In this regard, heads at such location have been observed to be relatively more susceptible to failures due to contamination. Accordingly, there is a need in the art for an improved disk drive and filtering configuration in comparison to the prior art.

SUMMARY OF THE INVENTION

According to an aspect of the present invention, there is provided a disk drive. The disk drive includes a disk drive base. The disk drive further includes a disk rotatably coupled to the disk drive base. The disk drive further includes a spindle motor attached to the disk drive base and configured to support the disk for rotating the disk with respect to the disk drive base. The disk drive further includes a filter component. The filter component includes a filter housing coupled to the disk drive base, and a filter element disposed within the filter housing for filtering disk rotation induced airflow. The filter element includes a coarse section and a fine section. The coarse section has a porosity greater than a porosity of the fine section.

According to various embodiments, the coarse section is disposed upstream in relation to the fine section with regard to the disk rotation induced airflow. The filter housing may include a first opening, and the coarse and fine sections of the filter element are exposed at the first opening. In an embodiment, the filter housing includes a single opening at the first opening. In another embodiment, the filter housing further includes a second opening disposed opposite the first opening, and the coarse and fine sections are exposed at second opening. In another embodiment, the coarse section of the filter element is exposed at the first opening, and the fine section of the filter element is exposed at the second opening.

Further, the disk drive may include a head stack assembly rotatably coupled to the disk drive base and disposed adjacent the disk. The filter component may be disposed upstream or downstream of the head stack assembly with regard to disk rotation induced airflow. The filter component may be radially disposed beyond the disk. In another embodiment, the disk includes a disk surface, and the filter component is radially disposed along the disk surface. The course section may be a unitary element and the fine section may be a unitary element. Alternatively, the course section may include multiple elements and the fine section may include multiple elements. The course section and the fine section may be disposed in spaced relation. The filter housing may be attached to the disk drive base. The disk drive may include a cover, and the filter housing extends between the disk drive base and the cover. The filter element may be formed of an electrostatic material.

BRIEF DESCRIPTION OF THE DRAWINGS

FIG. 4 is an exploded perspective view of a filter component of the disk drive of FIG. 1 according to an aspect of the present invention;

FIG. 5 is an exploded perspective view of a filter component of the disk drive of FIG. 1 according to another aspect of the present invention; and FIG. 6 is an exploded perspective view of a filter component of the disk drive of FIG. 1 according to another aspect of the present invention.

DESCRIPTION OF THE PREFERRED EMBODIMENTS

Figure 1:
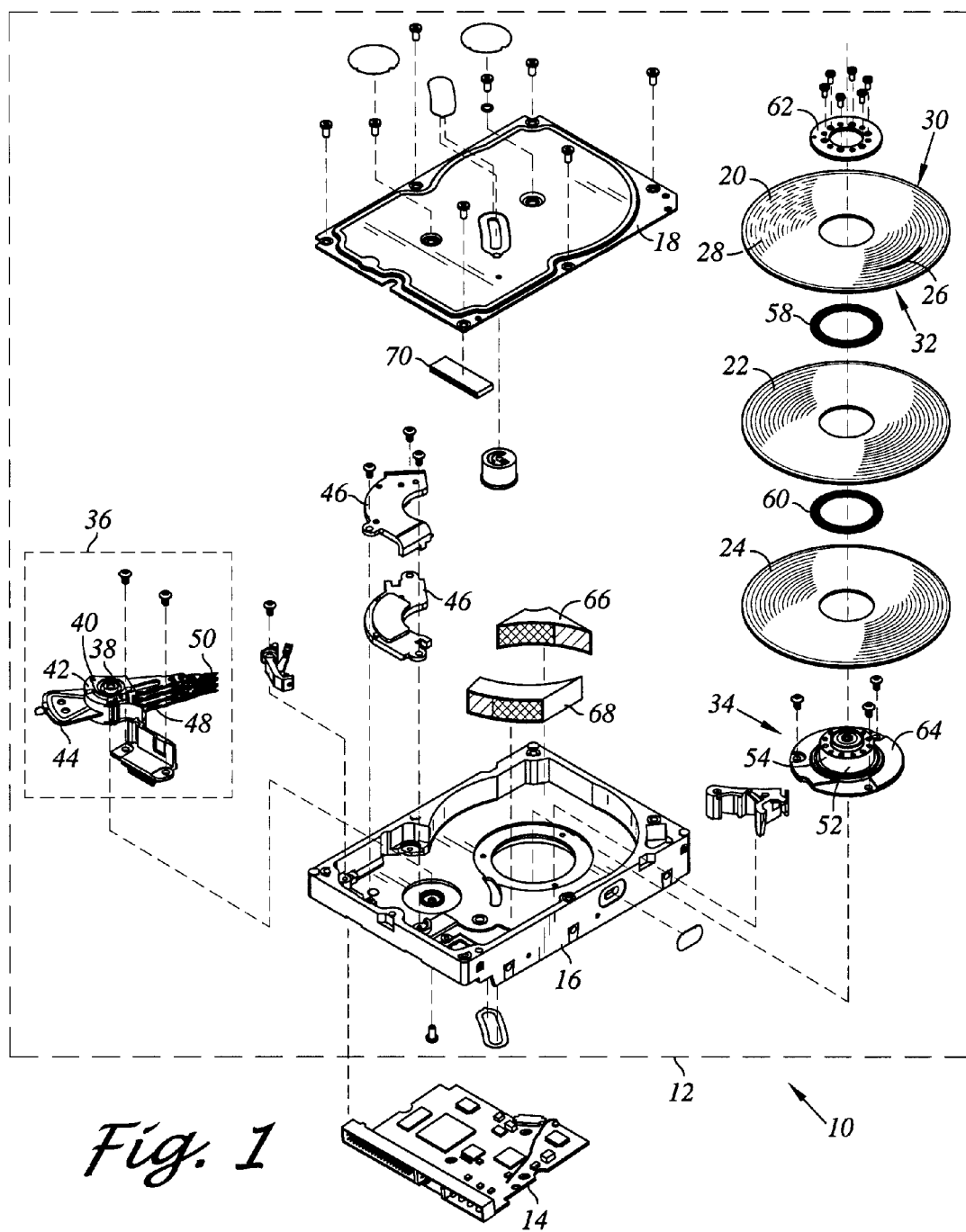
FIG. 1 is an exploded perspective view of a disk drive in accordance with an aspect of the present invention.

Referring now to the drawings wherein the showings are for purposes of illustrating preferred embodiments of the present invention only, and not for purposes of limiting the same, FIGS. 1-6 illustrate a disk drive including filter components in accordance with aspects of the present invention.

Referring now to FIG. 1 there is depicted an exploded perspective view of a disk drive 10 constructed in accordance with an aspect of the present invention. In the embodiment shown, the disk drive 10 includes a head disk assembly (HDA) 12 and a printed circuit board assembly (PCBA) 14. The head disk assembly 12 includes a housing which may include a disk drive base 16 and a cover 18 that collectively house magnetic disks 20, 22, 24. Each magnetic disk 20, 22, 24 contains a plurality of tracks for storing data. The magnetic disks 20, 22, 24 may be two-sided, and thus for example, the magnetic disk 20 is shown having a track 26 on an upper facing side 30 and a track 28 (shown in phantom) on a lower facing side 32. The head disk assembly 12 further includes a spindle motor 34 for rotating the magnetic disks 20, 22, 24. The head disk assembly 12 further includes a head stack assembly 36 and a pivot bearing cartridge 38. The head stack assembly 36 includes a rotary actuator 40.

The rotary actuator 40 includes an actuator body 42 that has a bore and the pivot bearing cartridge 38 is engaged within the bore for facilitating the rotary actuator 40 to rotate between limited positions. The rotary actuator 40 further includes a coil portion 44 that extends from one side of the actuator body 42 to interact with a pair of permanent magnets 46 to form a voice coil motor for pivoting the rotary actuator 40. A plurality of actuator arms, the lowermost one of which being denoted 48, extends from an opposite side of the actuator body 42. As the disks 20, 22, 24 may be two sided, each of the actuator arms includes either one or two head gimbal assemblies associated with the adjacent sides of the disks 20, 22, 24. Each head gimbal assembly includes an air bearing slider or slider (the uppermost one being denoted 50). Each air bearing slider 50 is contemplated to include a transducer head for reading and writing data from and to the disks 20, 22, 24.

The spindle motor 34 includes a spindle motor hub 52 that is rotatably attached to the disk drive base 16. The spindle motor hub 52 has a hub body 54 and a hub flange 56 that extends from the hub body 54, as shown in FIG. 4. The hub flange 56 includes a supporting surface for supporting a lowermost one of the disks, namely disk 24. The remaining disks 22, 20 are stacked and separated with annular disk spacers 58, 60 that are disposed about the hub body 54. A disk clamp 62 is attached about the spindle motor hub 52 and is utilized to apply a clamping force against the topmost disk 20 for securing all the disks 20, 22, 24 to the spindle motor hub 52. The spindle motor 34 may further include a spindle motor base 64 that is mounted to the disk drive base 16.

As will be discussed in further detail below, in the embodiment shown, the disk drive 10 includes filter components 66, 68, 70 which are generally configured to filter disk rotation induced airflow within the disk drive 10. It is understood that such filter components 66, 68, 70 represent various aspects of the present invention and that the invention may be practiced with any one of such filters 66, 68, 70 or in combination such as shown in this particular embodiment.

Figure 2:
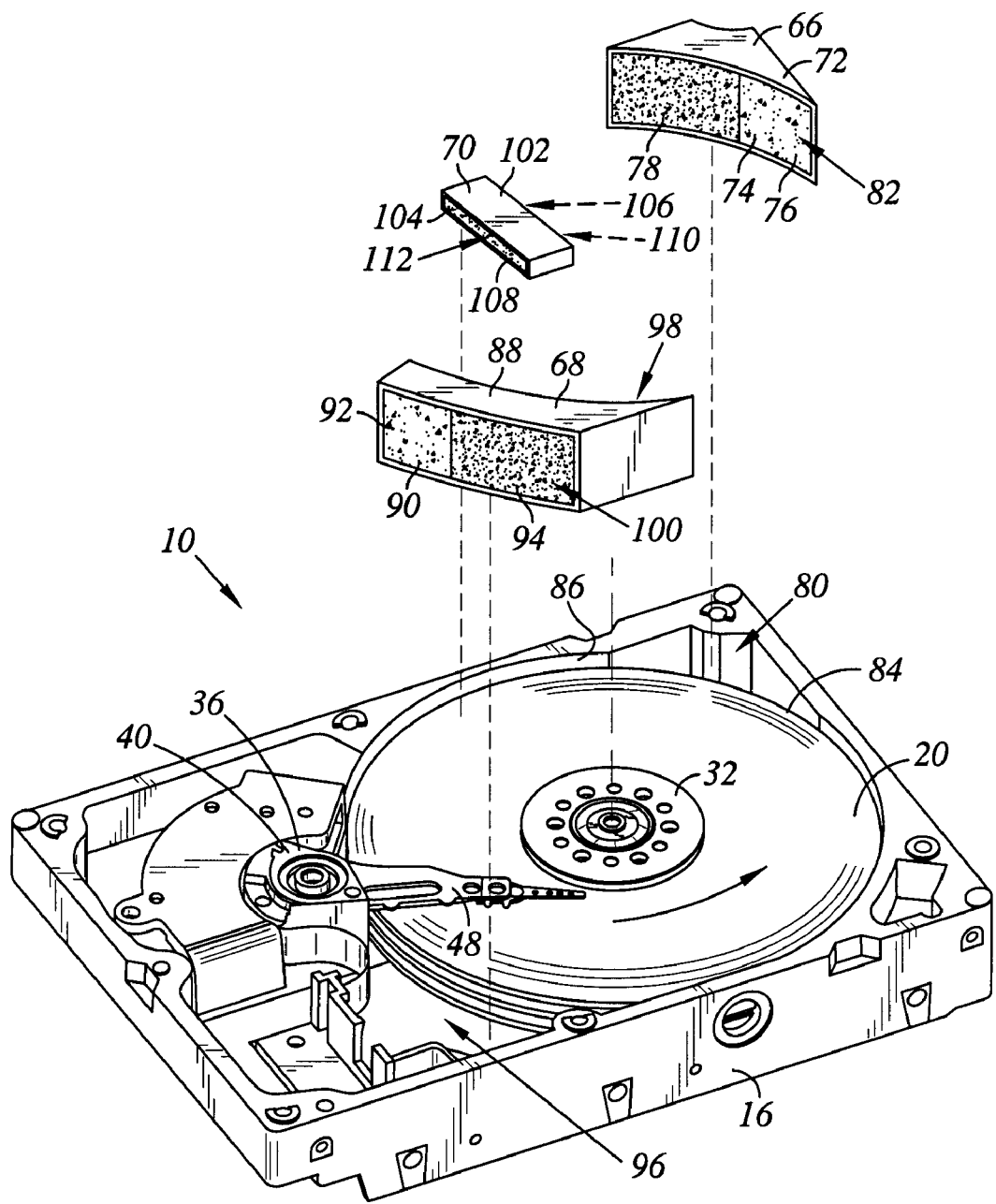
FIG. 2 is an enlarged perspective view of the disk drive (without a cover) of FIG. 1 as shown with filter components exploded from a remainder of the disk drive.
Figure 3:
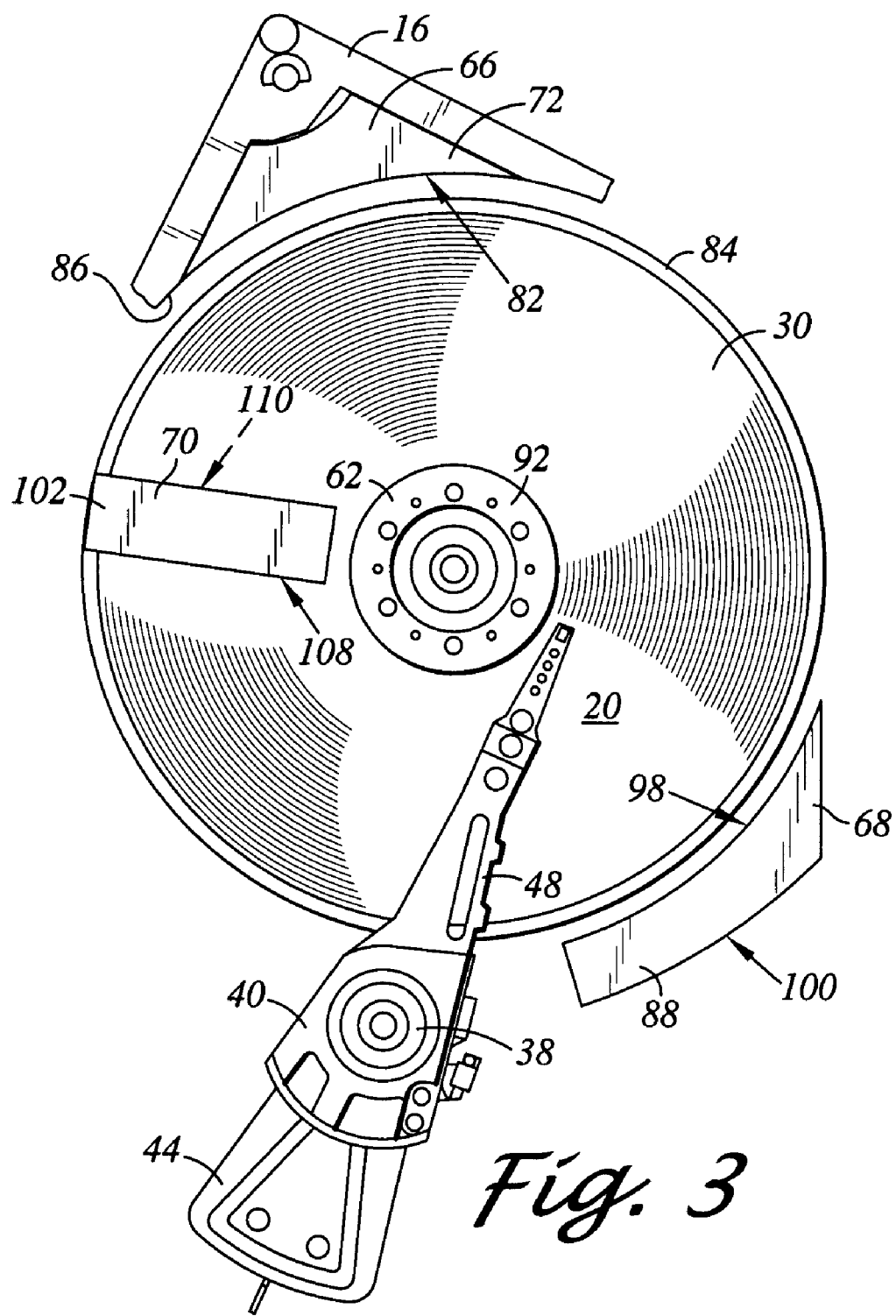
FIG. 3 is an enlarged plan view of selected components of the disk drive of FIG. 1 as assembled.

Referring additionally to FIG. 2 there is depicted an enlarged perspective view of the disk drive 10 (without the cover 18) of FIG. 1 as shown with filter components 66, 68, 70 exploded from a remainder of the disk drive 10. FIG. 3 is an enlarged plan view of selected components of the disk drive of FIG. 1 as assembled. Shown are the head stack assembly 36, the disk 20, a portion of the disk drive base 16 and the filter components 66, 68, 70. Enlarged exploded perspective views of the filter components 66, 68, 70 are depicted in FIGS. 4, 6 and 5 respectively.

According to an aspect of the present invention, there is provided the disk drive 10. The disk drive 10 includes the disk drive base 16. The disk drive 10 further includes the magnetic disk, such as disk 20, rotatably coupled to the disk drive base 16. The disk drive 10 further includes the spindle motor 34 attached to the disk drive base 16 and configured to support the disk 20 for rotating the disk 20 with respect to the disk drive base 16. The disk drive 10 further includes the filter component 66 as shown in FIG. 4. The filter component 66 includes a filter housing 72 coupled to the disk drive base 16, and a filter element 74 disposed within the filter housing 72 for filtering disk rotation induced airflow. The filter element 74 includes a coarse section 76 and a fine section 78. The coarse section 76 has a porosity greater than a porosity of the fine section 78.

As best seen in FIG. 2, the disk drive base 16 may be formed to include a cavity 80. The filter component 66 may be disposed within the cavity 80. The filter component 66 may be attached to the disk drive base 16. Preferably, the filter housing 72 extends between the disk drive base 16 and the cover 18. Such configuration is contemplated to avoid airflow from undesirably flowing between the filter component 66 and the cover 18.

In this embodiment, the filter housing 72 includes a first opening 82. The filter housing 72 includes a single opening at the first opening 82. The coarse and fine sections 76, 78 of the filter element 74 are exposed at the first opening 82. The first opening 82 is positioned immediately adjacent a disk edge 84 of the disk 20. The filter housing 72 and the filter element 74 at the first opening 82 are curved so as to smoothly transition to the adjoining a base shroud surface 86 formed in the disk drive base 16, as well as to conform to the shape of the adjacent disk edge 84. It is contemplated that the filter housing 72 may be constructed in accordance with any of those methods which are well known to one of ordinary skill in the art. In this regard, the filter housing 72 may be formed of a molded plastic material for example.

As shown in this embodiment, the filter component 66 is positioned upstream of the head stack assembly 36 in relation to the rotation of the disk 20. Further, the coarse section 76 is disposed upstream of the fine section 78 in relation to the rotation of the disk 20. During operation of the disk drive 10, disk rotation induced airflow is contemplated to generally tend to flow into the coarse 76 rather than the fine section 78. Airflow passes into the filter housing 72. As the filter housing 72 only has a single opening, airflow entering into filter element 74 tends to leave via passing through the fine section 78. Thus, such filter arrangement features a progressive filtering technique. In addition, as the filter housing 72 is characterized by having a single opening, the first opening 82, it is contemplated that contaminants filtered by the filter element 74 may tend to become "trapped" and collected by the filter housing 72 itself in addition to a tendency of the filter element 74 itself to retain filtered contaminants.

As mentioned above, the coarse section 76 has a porosity greater than a porosity of the fine section 78. In this regard, such differing porosity refers to an average in such given section and that the difference of such sections is greater than a mere difference due to manufacturing tolerances. The materials utilized to construct the filter element 74 are contemplated to be chosen from those which are well known to one of ordinary skill in the art. To further increase the filtering ability of the filter element 74, the filter element 74 may be formed of an electrostatic material. Although the filter element 74 is shown as a relatively thin piece of material, the filter element 74 may have a differing thickness and may take up a much larger volume within the filter housing 74. It is contemplated that the coarse and fine sections 76, 78 may be separately formed or integrally formed. To the extent that the coarse and fine sections 76, 78 are separately formed elements, the coarse and fine sections 76, 78 may or may not be attached to each other, and may or may not be flush against one another. Further the filter element 74 may be directly attached to the filter housing 72, such as with an adhesive. Alternatively, the filter element 74 may be simply held in place by the surrounding filter housing 72.

As shown in FIG. 6, according to another aspect of the present invention, the disk drive 10 includes the filter component 68 according to another embodiment. The filter component 68 includes a filter housing 88 coupled to the disk drive base 16, and a filter element 90 disposed within the filter housing 88 for filtering disk rotation induced airflow. The filter element 90 includes a coarse section 92 and a fine section 94. The coarse section 94 has a porosity greater than a porosity of the fine section 94. The disk drive base 16 may include a cavity 96 and the filter component 68 may be disposed in a cavity 96.

In this embodiment, the filter housing 88 includes a first opening 98 and an opposing second opening 100. The coarse and fine sections 92, 94 of the filter element 90 are exposed to both the first opening 98 and the second opening 100. As shown, the coarse section 92 is formed of multiple elements, in this case, two elements at each of the first and second openings 98, 100. The fine section 94 is formed of multiple elements, in this case, two elements at each of the first and second openings 98, 100. The first opening 98 is positioned immediately adjacent a disk edge 84 of the disk 20. The filter housing 88 and the filter element 90 at the first opening 98 are curved to generally follow the shape of the disk edge 84. The second opening 100 is exposed to the cavity 96.

In this embodiment, the filter component 68 is positioned downstream of the head stack assembly 36 in relation to the rotation of the disk 20. Further, the coarse section 92 is disposed upstream of the fine section 94 in relation to the rotation of the disk 20. During operation of the disk drive 10, disk rotation induced airflow is contemplated to generally tend to flow into the coarse 92 rather than the fine section 94. In this regard, airflow is contemplated to enter into the filter element 90 from both the first and second openings 98, 100. Airflow entering into the filter element 90 tends to leave via passing through the fine section 78 at the first opening 100. As the course and fine sections 92, 94 are each formed of two elements in spaced relation to each other, contaminants may become trapped in the region between them within the filter housing 88.

As shown in FIG. 5, according to another aspect of the present invention, the disk drive 10 includes the filter component 70 according to another embodiment. The filter component 70 includes a filter housing 102 coupled to the disk drive base 16, and a filter element 104 disposed within the filter housing 102 for filtering disk rotation induced airflow. The filter element 104 includes a coarse section 106 and a fine section 108. The coarse section 106 has a porosity greater than a porosity of the fine section 108.

The filter component 70 is positioned between the upper facing side 30 of the disk 20 and the cover 18. In this regard, the filter housing 102 may be attached to the cover 18. The filter component 70 is positioned radially with respect to the disk 20. The filter housing 102 includes a first opening 110 and an opposing second opening 112. The coarse section 106 is positioned upstream of the fine section 108 with regard to rotation of the disk 20. Thus, only the coarse section 106 is exposed at the first opening 110 and only the fine section 108 is exposed at the second opening 112. It is contemplated that disk rotation induced airflow enters the course section 106 through the first opening 110, passes within the filter housing 102, and exits the fine section 108 through the second opening 112. Thus, such filter arrangement features a progressive filtering technique. Further, as the coarse and fine sections 106, 108 are disposed in spaced relation to each other, contaminants may become trapped and collected within the filter housing 102.

During operation of the disk drive 10, of particular concern is the occurrence of turbulent airflow that may tend to excite a resonance response of the head stack assembly 36. Further, such disk rotation induced airflow may result in a force applied to the head stack assembly 36, i.e., windage. In addition, such disk rotation induced airflow may result in vibration of the disk 20 or disk flutter. As such, the filter component 70 may serve the dual purpose of filtering as well as providing an airflow shielding function in respect to the head stack assembly 36.

We claim:
1. A disk drive comprising:
a disk drive base;
a disk rotatably coupled to the disk drive base; and
a filter component including:
 a filter housing positioned in a cavity of the disk drive base, wherein the filter housing comprises first and second, spaced apart openings; and
 a pair of filter elements disposed within the filter housing for filtering disk rotation induced airflow, one of the pair of filter elements is exposed to the first opening and the other of the pair of filter elements is exposed to the second opening in the filter housing and each of the filter elements comprising a coarse section and a fine section, wherein for each of the filter elements the coarse section is positioned upstream of the fine section relative to a direction of the induced airflow.

2. The disk drive of claim 1, wherein the filter elements are spaced apart in the housing and wherein at least a portion of the induced airflow flows through the coarse sections into the filter housing and then out of the filter housing through the fine sections.

3. The disk drive of claim 1, further comprising:
   a head stack assembly, the filter housing disposed upstream of the head stack assembly with regard to the induced airflow; and
   a second filter component including a filter housing positioned between the upper facing side of the disk and a cover of the disk drive and a second filter element disposed within the filter housing for filtering a portion of the induced airflow flowing along the upper facing side of the disk.

4. The disk drive of claim 3, further comprising a third filter component that includes:
   a filter housing positioned in another cavity of the disk drive base proximate to an edge of the disk, the filter housing comprising only one opening and the one opening is positioned adjacent to the edge of the disk; and
   a third filter element disposed within the filter housing for filtering the induced airflow, the third filter element including a coarse section and a fine section both exposed to the one opening with the coarse section being disposed upstream to the fine section with regard to the induced airflow.

\* \* \* \* \*